(12) United States Patent
Lin et al.

(10) Patent No.: US 10,820,016 B2
(45) Date of Patent: Oct. 27, 2020

(54) ENCODING AND DECODING METHOD AND DEVICE FOR DATA COMPRESSION

(71) Applicants: TONGJI UNIVERSITY, Shanghai (CN); ZTE CORPORATION, Guangdong (CN)

(72) Inventors: Tao Lin, Shanghai (CN); Liping Zhao, Shanghai (CN); Kailun Zhou, Shanghai (CN); Shuhui Wang, Shanghai (CN); Ming Li, Guangdong (CN); Ping Wu, Guangdong (CN); Zhao Wu, Guangdong (CN)

(73) Assignees: Tongji University, Shanghai (CN); ZTE Corporation, Guangdong (CN)

( * ) Notice: Subject to any disclaimer, the term of this patent is extended or adjusted under 35 U.S.C. 154(b) by 208 days.

(21) Appl. No.: 16/090,101

(22) PCT Filed: Feb. 10, 2017

(86) PCT No.: PCT/CN2017/073247
§ 371 (c)(1),
(2) Date: Sep. 28, 2018

(87) PCT Pub. No.: WO2017/137006
PCT Pub. Date: Aug. 17, 2017

(65) Prior Publication Data
US 2019/0110079 A1    Apr. 11, 2019

(30) Foreign Application Priority Data

Feb. 10, 2016 (CN) .......................... 2016 1 0083476
Feb. 8, 2017 (CN) .......................... 2017 1 0069807

(51) Int. Cl.
*H04N 19/70* (2014.01)
*H04N 19/176* (2014.01)
(Continued)

(52) U.S. Cl.
CPC ........... *H04N 19/70* (2014.11); *H04N 19/103* (2014.11); *H04N 19/11* (2014.11); *H04N 19/176* (2014.11);
(Continued)

(58) Field of Classification Search
CPC ...... H04N 19/70; H04N 19/593; H04N 19/11; H04N 19/52; H04N 19/537; H04N 19/463;
(Continued)

(56) References Cited

U.S. PATENT DOCUMENTS

2015/0146976 A1 * 5/2015 Ma ...................... H04N 19/593
                                                                  382/166
2015/0229971 A1    8/2015 Ye et al.
(Continued)

FOREIGN PATENT DOCUMENTS

CN            104244007 A        12/2014

OTHER PUBLICATIONS

Chen et al, "2D Intra String Copy Algorithm for Screen Content Encoding" Jounal of Computer Applications, No. 9, Sep. 10, 2015, ISSN: 1001-9081, pp. 2641-2644, translated to English, now pp. 1-40. (Year: 2015).*

(Continued)

*Primary Examiner* — Yon J Couso
(74) *Attorney, Agent, or Firm* — Knobbe, Martens, Olson & Bear, LLP

(57) ABSTRACT

Provided is an encoding and decoding method and device for data compression. The encoding method includes: adaptively selecting a constrained string mode from a plurality of preset constrained string modes; and performing, according to the selected constrained string mode, string-matching encoding on a coding block to obtain information of a constrained string encoded in the selected constrained string (Continued)

Adaptively select a constrained string mode from a plurality of preset constrained string modes — S102

Perform, according to the selected constrained string mode, string-matching encoding on a coding block to obtain information of a constrained string encoded in the selected constrained string mode and to obtain a bitstream of a syntax element of the constrained string encoded in the selected constrained string mode — S104 mode and to obtain a bitstream of a syntax element of the constrained string encoded in the selected constrained string mode.

18 Claims, 2 Drawing Sheets

(51) Int. Cl.
    *H04N 19/42* (2014.01)
    *H04N 19/463* (2014.01)
    *H04N 19/537* (2014.01)
    *H04N 19/52* (2014.01)
    *H04N 19/11* (2014.01)
    *H04N 19/593* (2014.01)
    *H04N 19/103* (2014.01)
    *H04N 19/46* (2014.01)
    *H04N 19/61* (2014.01)

(52) U.S. Cl.
    CPC ............ *H04N 19/42* (2014.11); *H04N 19/46* (2014.11); *H04N 19/463* (2014.11); *H04N 19/52* (2014.11); *H04N 19/537* (2014.11); *H04N 19/593* (2014.11); *H04N 19/61* (2014.11)

(58) Field of Classification Search
    CPC ...... H04N 19/42; H04N 19/46; H04N 19/103; H04N 19/176; H04N 19/61
    See application file for complete search history.

(56) References Cited

U.S. PATENT DOCUMENTS

| | | | | |
|---|---|---|---|---|
| 2015/0249841 A1* | 9/2015 | Yu | .......................... | H04N 19/70 375/240.02 |
| 2015/0264348 A1* | 9/2015 | Zou | ....................... | H04N 19/593 375/240.02 |
| 2016/0191931 A1* | 6/2016 | Hannuksela | ......... | H04N 19/136 375/240.12 |
| 2017/0238001 A1* | 8/2017 | Li | .......................... | H04N 19/96 375/240.12 |
| 2018/0007359 A1* | 1/2018 | Hsiang | ................... | H04N 19/70 |

OTHER PUBLICATIONS

International Search Report dated Apr. 24, 2017 for International Application No. PCT/CN2017/073247, 5 pages.
Written Opinion of the International Searching Authority dated Apr. 24, 2017 for International Application No. PCT/CN2017/073247, 4 pages.
Chen, Xianyi et al., "2D intra string copy for screen content coding" Journal of Computer Applications, No. 9, Sep. 10, 2015, ISSN: 1001-9081, pp. 2641-2644.
Extended European Search Report for Application No. 17749897.9 dated Jun. 11, 2019 in 11 pages.
Chang, et al., Intra Line Copy for HEVC Screen Coding, Association Annual Summit and Conference (APSIPA), 2014 Asia-Pacific, Asia-Pacific Signal and Information Processing ASS, Dec. 9, 2014, XP032736469, 8 Pages.
Xu, et al., CE 7 Test 2 Constrained 1-D String Based Index Coding for Palette Index Coding, JCT-VC Meeting; Oct. 8, 2014, XP030116932, 6 Pages.
Chen, et al., BoG on 1D Dictionary, JCT-VC Meeting, Jul. 7 , 2014, XP030116654, 10 Pages.
Li, et al., CE3 results of test B.1 and Test B.7, JCT-VC Meeting, Jan. 30, 2015, XP030117149, 18 Pages.
Zhao, et al., Universal String Matching for ultra High Quality and Ultra High Efficiency SCC, JVET Meeting, Feb. 21, 2016, XP030150048, 4 Pages.

* cited by examiner

ENCODING AND DECODING METHOD AND DEVICE FOR DATA COMPRESSION

CROSS-REFERENCE TO RELATED APPLICATIONS

This is the U.S. National Phase Application, filed under 35 U.S.C. 371, of International Patent Application No. PCT/CN2017/073247, filed on Feb. 10, 2017, which claims priorities to Chinese patent application No. 201610083476.5 filed on Feb. 10, 2016 and Chinese patent application No. 201710069807.4 filed on Feb. 8, 2017, the entire disclosure of each of which is incorporated herein by reference in its entirety.

TECHNICAL FIELD

The present disclosure relates to a communications field and, in particular, to an encoding and decoding method and device.

BACKGROUND

As the human society enters the era of big data, cloud computing, mobile computing, cloud-mobile computing, ultra-high (4K) and ultra-high (8K) video picture definition, 4G/5G communications, extremely high-quality data compression with an ultra-high compression ratio becomes an essential technology to compress various data, including Big Data, picture data, and video data.

A data set is a set of data samples (such as bytes, bits, pixels, pixel components). In the encoding (and corresponding decoding) for data compression performed on a data set (such as a file, picture and a video sequence), the data set is usually divided into several blocks of subsets called coding blocks (or decoding blocks from a decoding perspective, and the coding blocks and the decoding blocks are collectively referred to as coding-decoding blocks). The encoding or decoding is performed in units of coding-decoding blocks. At any time, a coding block being encoded is referred to as a current coding block. At any time, a decoding block being decoded is referred to as a current decoding block. The current coding block or the current decoding block is collectively referred to as a current coding-decoding block or simply referred to as a current block. A sample being encoded or decoded is called a current coding sample or a current decoding sample, which is simply referred to as a current sample.

A notable feature of many common data sets is that the data sets have many matching (i.e., similar or even identical) patterns. For example, picture or a video sequence usually has many matching pixel patterns. Therefore, in existing data compression techniques, a matching (also called prediction or compensation) mode is usually employed. The matching means that a "prediction value" (also called a "compensation value" or a "reference sample", such as a "reference pixel") is used for the matching (also called prediction, expression, representation, compensation, approximation, etc.) of the current sample being encoded or decoded (referred to as the "current sample") to achieve lossless or lossy data compression. Simply speaking, a basic operation of the matching mode is to replicate the reference sample (i.e., a sample at a reference position) to a position of the current sample. Therefore, the matching mode or the prediction manner is also called a copying manner. In the matching mode, reconstructed (rebuilt or restored) samples, that have undergone at least part of encoding operations and at least part of decoding operations, constitute a main reference set (also called a main reference space or a main reference buffer). The reconstructed samples and their positions in the main reference set are in one-to-one correspondence with original samples and their locations in an original data set. In the matching mode, in addition to the main reference set, other reference sets may be constructed or generated, referred to as a secondary reference set, a subordinate reference set or a second reference set, a third reference set and so on.

Two commonly used matching modes are block-matching mode and string-matching mode. The block-matching mode is characterized in that the basic matching units are several kinds of predetermined fixed-size blocks (sample blocks). A basic matching parameter (also called a matching relationship, a copying parameter or a copying relationship) of the block-matching is a displacement vector (also called a motion vector, a position offset, an offset, a relative position, a position, a relative address, an address, a relative coordinate, a coordinate, a relative index, an index, etc.). The displacement vector indicates a position (often called a reference position) of a reference sample block (simply referred to as a reference block) of a current sample block (simply referred to as a current block). The string-matching mode is characterized in that a basic matching unit is a string (sample string) having a predetermined shape and a variable length. Basic matching parameters (also called matching relationships, copying parameters or copying relationships) of the string-matching are a displacement vector (also referred to as a motion vector, a position offset, an offset, a relative position, a position, a relative address, an address, a relative coordinate, a coordinate, a relative index, an index, etc.), a string length and an unmatched sample. The displacement vector indicates a reference position of a reference sample string (simply referred to as a reference string) of a current sample string (simply referred to as a current string), which is equivalent to a one-dimensional offset after data samples are arranged into one-dimensional data. The string length indicates a length of the current string, that is, the number of samples. The unmatched sample is also referred to as a non-reference sample, indicating the current sample without reference samples.

If the coding-decoding block is two-dimensional (which is not necessarily limited to a square or a rectangle and may have any other appropriate two-dimensional shape), samples in the coding-decoding block need to be arranged in a certain order and then is encoded or decoded in the string-matching mode. An arrangement mode is also called a scanning mode. Commonly used scanning modes are horizontal scanning (which may be divided into grating scanning and arc scanning) and vertical scanning (which may also be divided into grating scanning and arc scanning).

The string-matching has a flexible matching shape and a variable matching length, thereby having a matching accuracy much higher than the block-matching. However, the string matching has a problem that there are a large number of matching parameters (also called matching relationships, copying parameters or copying relationships) and a large number of bits are consumed to encode a coding block, thereby affecting encoding efficiency.

SUMMARY

Embodiments of the present disclosure provide an encoding and decoding method and device for data compression to at least reduce the number of matching parameters exist in a string-matching mode and the number of bits consumed to encode a coding block.

According to an aspect of the embodiments of the present disclosure, provided is an encoding method for data compression, including: adaptively selecting a constrained string mode from a plurality of preset constrained string modes; and performing, according to the selected constrained string mode, string-matching encoding on a coding block to obtain information of a constrained string encoded in the selected constrained string mode and to obtain a bitstream of a syntax element of the constrained string encoded in the selected constrained string mode.

In an embodiment, the coding block is a coding region of picture and the coding block includes at least one of: picture, a sub-picture of the picture, a macroblock, a largest coding unit (LCU), a coding tree unit (CTU), a coding unit (CU), a sub-region of the CU, a prediction unit (PU) or a transform unit (TU).

In an embodiment, the constrained string mode includes: one preset constraint condition; or a plurality of preset constraint conditions; or no preset constraint condition.

In an embodiment, a preset constraint condition of the constrained string mode includes one basic constraint condition or a combination of a plurality of basic constraint conditions of a group consisting of: a basic constraint condition 1: a string of at least one reference sample taken within a preset range from a reference position has a length with an upper limit and/or a lower limit; a basic constraint condition 2: a string of at least one reference sample taken within a preset range from a reference position has a length limited to a group of preset values; a basic constraint condition 3: in one coding block, a number of strings of at least one reference sample taken from a preset reference set or a preset reference subset has an upper limit; a basic constraint condition 4: in one coding block, a number of strings of at least one reference sample taken within a preset range from a reference position has an upper limit; a basic constraint condition 5: a string has a length equal to a number of samples of a coding block; a basic constraint condition 6: a string has a length equal to half a number of samples of a coding block; a basic constraint condition 7: a string has a length equal to a preset value; a basic constraint condition 8: a string has a length limited to a group of preset values; a basic constraint condition 9: a coding block is a square and a string has a length equal to a side of the square; a basic constraint condition 10: a coding block is a rectangle and a string has a length equal to a length or a width of the rectangle; a basic constraint condition 11: a string has a displacement vector equal to a preset value; a basic constraint condition 12: a string has a displacement vector limited to a group of preset values; a basic constraint condition 13: a coding block is a square, a displacement vector of a string is equal to (0, 1) in horizontal scanning and (1, 0) in vertical scanning, and the displacement vector is equal to a side of the square after being converted to an equivalent one-dimensional offset; a basic constraint condition 14: a coding block is a rectangle, a displacement vector of a string is equal to (0, 1) in horizontal scanning and (1, 0) in vertical scanning, and the displacement vector is equal to a length or a width of the rectangle after being converted to an equivalent one-dimensional offset; a basic constraint condition 15: a string has a length limited to a preset value or a group of preset values, and a displacement vector of a string is limited to a preset value or a group of preset values; a basic constraint condition 16: a reference string has a length equal to 1 and has only one reference sample, and a current string has a length greater than or equal to 1, and all current samples are equal to the reference sample; a basic constraint condition 17: at least one reference sample is located within a current block; a basic constraint condition 18: a coding block is two-dimensional and of all strings each is vertical and has a starting point and an ending point at edges of the coding block; or a basic constraint condition 19: a coding block is two-dimensional and of all strings each is horizontal and has a starting point and an ending point at edges of the coding block.

In an embodiment, the plurality of preset constrained string modes includes three constrained string modes. Among the three constrained string modes, a first constrained string mode includes the basic constraint condition 1 and the basic constraint condition 3, a second constrained string mode includes the basic constraint condition 5 and the basic constraint condition 6, and a third constrained string mode includes the basic constraint condition 13, the basic constraint condition 16 and the basic constraint condition 17.

In an embodiment, the plurality of preset constrained string modes includes four constrained string modes. Among the four constrained string modes, a first constrained string mode includes the basic constraint condition 1 and the basic constraint condition 3, a second constrained string mode includes the basic constraint condition 5 and the basic constraint condition 6, a third constrained string mode includes the basic constraint condition 13, the basic constraint condition 16 and the basic constraint condition 17, and a fourth constrained string mode includes the basic constraint condition 18 and the basic constraint condition 19.

In an embodiment, in the basic constraint condition 1, the preset range from the reference position is a region range including a CTU where the coding block exists and K neighboring CTUs, and the length of the string has an upper limit of 32 and/or a lower limit of 1; and in the basic constraint condition 3, the preset reference set or the preset reference subset is a main reference set, and the upper limit of a total number of the strings is preset to be a total number of samples of the coding block multiplied by a fraction M/N.

In an embodiment, the bitstream includes an enable flag indicating a string-matching mode of the plurality of constrained string modes, where a position of the enable flag in the bitstream includes at least one of: a sequence parameter set, picture parameter set, a slice header, a CTU header, a CU header or a coding block header.

In an embodiment, the plurality of preset constrained string modes are represented by a plurality of preset values, where each constrained string mode corresponds to a respective preset value k, and the coding block has a constrained string mode identification element presented in the bitstream directly, indirectly, or directly and indirectly; and when the constrained string mode identification element is equal to k, a constrained string mode corresponding to k is used for performing the string-matching encoding on the coding block.

In an embodiment, a directly-presented constrained string mode identification element includes one or more bits in the bitstream; an indirectly-presented constrained string mode identification element is derived from another coding parameter and/or another syntax element in the bitstream; a directly-indirectly presented constrained string mode identification element is obtained by mixing a directly-presented part of the constrained string mode identification element and an indirectly-presented part of the constrained string mode identification element.

In an embodiment, a syntax element of a constrained string mode identification element indicating a constrained string mode of the coding block exists in the bitstream of the coding block in one form of a group consisting of: coding block header information, the constrained string mode identification element, a syntax element of a sample string or an unmatched sample; or, the coding block header information, a part of the constrained string mode identification element, a part of a syntax element of a first sample string, a remaining part of the constrained string mode identification element, the syntax element of the sample string or the unmatched sample, where a constrained string mode corresponding to the constrained string mode identification element is used for performing the string-matching encoding on the coding block.

According to another aspect of the embodiments of the present disclosure, provided is an encoding device for data compression, including: a selection module, which is configured to adaptively select a constrained string mode from a plurality of preset constrained string modes; and an encoding module, which is configured to perform, according to the selected constrained string mode, string-matching encoding on a coding block to obtain information of a constrained string encoded in the selected constrained string mode and to obtain a bitstream of a syntax element of the constrained string encoded in the selected constrained string mode.

According to another aspect of the embodiments of the present disclosure, provided is a decoding method for data compression, including: parsing a bitstream to obtain information of a constrained string mode; and selecting, according to the information of the constrained string mode, a constrained string mode from a plurality of preset constrained string modes and performing, according to the selected constrained string mode, string copying decoding on a decoding block.

In an embodiment, the decoding block is a decoding region of picture and the decoding block includes at least one of picture, a sub-picture of the picture, a macroblock, a largest coding unit (LCU), a coding tree unit (CTU), a coding unit (CU), a sub-region of the CU, a prediction unit (PU) or a transform unit (TU).

In an embodiment, the constrained string mode includes: one preset constraint condition; or a plurality of preset constraint conditions; or no preset constraint condition.

In an embodiment, a preset constraint condition of the constrained string mode includes one basic constraint condition or a combination of a plurality of basic constraint conditions of a group consisting of: a basic constraint condition 1: a string of at least one reference sample taken within a preset range from a reference position has a length with an upper limit and/or a lower limit; a basic constraint condition 2: a string of at least one reference sample taken within a preset range from a reference position has a length limited to a group of preset values; a basic constraint condition 3: in one decoding block, a number of strings of at least one reference sample taken from a preset reference set or a preset reference subset has an upper limit; a basic constraint condition 4: in one decoding block, a number of strings of at least one reference sample taken within a preset range from a reference position has an upper limit; a basic constraint condition 5: a string has a length equal to a number of samples of a decoding block; a basic constraint condition 6: a string has a length equal to half a number of samples of a decoding block; a basic constraint condition 7: a string has a length equal to a preset value; a basic constraint condition 8: a string has a length limited to a group of preset values; a basic constraint condition 9: a decoding block is a square and a string has a length equal to a side of the square; a basic constraint condition 10: a decoding block is a rectangle and a string has a length equal to a length or a width of the rectangle; a basic constraint condition 11: a string has a displacement vector equal to a preset value; a basic constraint condition 12: a string has a displacement vector limited to a group of preset values; a basic constraint condition 13: a decoding block is a square, a displacement vector of a string is equal to (0, 1) in horizontal scanning and (1, 0) in vertical scanning, and the displacement vector is equal to a side of the square after being converted to an equivalent one-dimensional offset; a basic constraint condition 14: a decoding block is a rectangle, a displacement vector of a string is equal to (0, 1) in horizontal scanning and (1, 0) in vertical scanning, and the displacement vector is equal to a length or a width of the rectangle after being converted to an equivalent one-dimensional offset; a basic constraint condition 15: a string has a length limited to a preset value or a group of preset values, and a string has a displacement vector limited to a preset value or a group of preset values; a basic constraint condition 16: a reference string has a length equal to 1 and has only one reference sample, and a current string has a length greater than or equal to 1, and all current samples are equal to the reference sample; a basic constraint condition 17: at least one reference sample is located within a current block; a basic constraint condition 18: a decoding block is two-dimensional and of all strings each is vertical and has a starting point and an ending point at edges of the decoding block; and a basic constraint condition 19: a decoding block is two-dimensional and of all strings each is horizontal and has a starting point and an ending point at edges of the decoding block.

In an embodiment, the plurality of preset constrained string modes includes three constrained string modes. Among the three constrained string modes, a first constrained string mode includes the basic constraint condition 1 and the basic constraint condition 3, a second constrained string mode includes the basic constraint condition 5 and the basic constraint condition 6, and a third constrained string mode includes the basic constraint condition 13, the basic constraint condition 16 and the basic constraint condition 17.

In an embodiment, the plurality of preset constrained string modes includes four constrained string modes. Among the four constrained string modes, a first constrained string mode includes the basic constraint condition 1 and the basic constraint condition 3, a second constrained string mode includes the basic constraint condition 5 and the basic constraint condition 6, a third constrained string mode includes the basic constraint condition 13, the basic constraint condition 16 and the basic constraint condition 17, and a fourth constrained string mode includes the basic constraint condition 18 and the basic constraint condition 19.

In an embodiment, in the basic constraint condition 1, the preset range from the reference position is a region range including a CTU where the decoding block exists and K neighboring CTUs, and the length of the string has an upper limit of 32 and/or a lower limit of 1; and in the basic constraint condition 3, the preset reference set or the preset reference subset is a main reference set, and the upper limit of a total number of the strings is preset to be a total number of samples of the decoding block multiplied by a fraction M/N.

In an embodiment, the bitstream includes an enable flag indicating a string-matching mode of the plurality of constrained string modes, where a position of the enable flag in the bitstream includes at least one of: a sequence parameter set, picture parameter set, a slice header, a CTU header, a CU header or a decoding block header.

In an embodiment, the plurality of preset constrained string modes are represented by a plurality of preset values, where each constrained string mode corresponds to a respective preset value k, and the decoding block has a constrained string mode identification element presented in the bitstream directly, indirectly, or directly and indirectly; and when the constrained string mode identification element is equal to k, a constrained string mode corresponding to k is used for performing string copying decoding on the decoding block.

In an embodiment, a directly-presented constrained string mode identification element includes one or more bits in the bitstream; an indirectly-presented constrained string mode identification element is derived from another decoding parameter and/or another syntax element in the bitstream; a directly-indirectly-presented constrained string mode identification element is obtained by mixing a directly-presented part of the constrained string mode identification element and an indirectly-presented part of the constrained string mode identification element.

In an embodiment, a syntax element of the constrained string mode identification element indicating a constrained string mode of the decoding block exists in the bitstream of the decoding block in one form of a group consisting of: decoding block header information, the constrained string mode identification element, a syntax element of a sample string or an unmatched sample; or, the decoding block header information, a part of the constrained string mode identification element, a part of a syntax element of a first sample string, a remaining part of the constrained string mode identification element, the syntax element of the sample string or the unmatched sample, where a constrained string mode corresponding to the constrained string mode identification element is used for performing the string copying decoding on the decoding block.

According to another aspect of the embodiments of the present disclosure, provided is a decoding device for data compression, including: a parsing module, which is configured to parse a bitstream to obtain information of a constrained string mode; and a decoding module, configured to select, according to the information of the constrained string mode, a constrained string mode from a plurality of preset constrained string modes and to perform, according to the selected constrained string mode, string copying decoding on a decoding block.

According to another embodiment of the present disclosure, further provided is storage medium. The storage medium is configured to store program codes for executing the steps described below.

A constrained string mode is adaptively selected from a plurality of preset constrained string modes. According to the selected constrained string mode, string-matching encoding is performed on a coding block to obtain information of a constrained string encoded in the selected constrained string mode and to obtain a bitstream of a syntax element of the constrained string encoded in the selected constrained string mode.

According to another embodiment of the present disclosure, further provided is storage medium. The storage medium is configured to store program codes for executing the steps described below.

A bitstream is parsed to obtain information of a constrained string mode. According to the information of the constrained string mode, a constrained string mode is selected from a plurality of preset constrained string modes, and string copying decoding is performed on a decoding block according to the selected constrained string mode.

With the embodiments of the present disclosure, a constrained string mode is adaptively selected from the plurality of preset constrained string modes and according to the selected constrained string mode, the string-matching encoding is performed on the coding block in data to be compressed to obtain the information of the constrained string encoded in the selected constrained string mode and to obtain the bitstream of the syntax element of the constrained string encoded in the selected constrained string mode. In this manner, since the coding block in the data to be compressed is encoded in one constrained string mode selected from the plurality of preset constrained string modes, the number of matching parameters for encoding the coding block is reduced; and since only one constrained string mode is used, the string-matching accuracy in the encoding process is improved, thereby reducing the number of matching parameters exist in a string-matching mode and the number of bits consumed to encode a coding block.

BRIEF DESCRIPTION OF DRAWINGS

The accompanying drawings described herein are used to provide a further understanding of the present disclosure, and form a part of the present application. The exemplary embodiments and descriptions thereof in the present disclosure are used to explain the present disclosure and do not limit the present disclosure in an improper way. In the accompanying drawings.

DETAILED DESCRIPTION

The present disclosure will be described in detail with reference to the accompanying drawings in conjunction with the embodiments. It is to be noted that if not in collision, the embodiments and features therein in the present application can be combined with each other.

Figure 1:
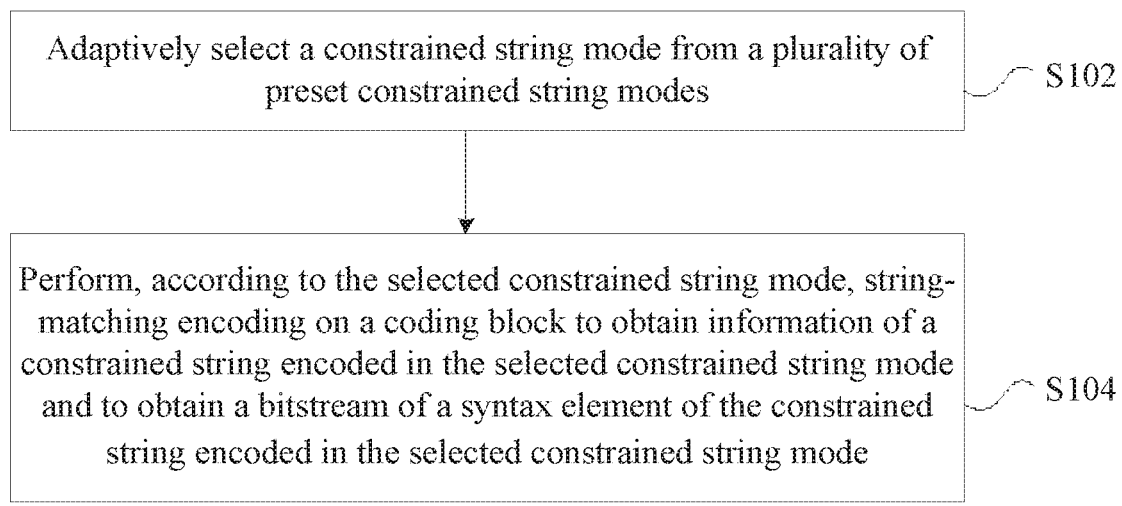
FIG. 1 is a flowchart 1 of an encoding method for data compression according to an embodiment of the present disclosure.

The present embodiment provides an encoding method for data compression. FIG. 1 is a flowchart of an encoding method for data compression according to an embodiment of the present disclosure. As shown in FIG. 1, the method includes the steps described below.

In step S102, a constrained string mode is adaptively selected from a plurality of preset constrained string modes.

In step S104, string-matching encoding is performed on a coding block according to the selected constrained string mode to obtain information of a constrained string encoded in the selected constrained string mode and to obtain a bitstream of a syntax element of the constrained string encoded in the selected constrained string mode.

The present embodiment provides a method for data compression in which a plurality of constrained string modes are used for the string-matching encoding. In a string-matching mode, a constrained string refers to a string constrained by preset constraint conditions. The string constrained by preset constraint conditions is used in the process of performing the string-matching encoding on the coding block in the constrained string mode. In the present embodiment, a constrained string mode is adaptively selected from the plurality of preset constrained string modes to indicate which constrained string mode is used by the coding block, and according to the selected constrained string mode, the string-matching encoding is performed on the coding block in data to be compressed to obtain the information of the constrained string encoded in the selected constrained string mode and to obtain the bitstream of the syntax element of the constrained string encoded in the selected constrained string mode. In this manner, since the coding block in the data to be compressed is encoded in one constrained string mode selected from the plurality of preset constrained string modes, the number of matching parameters for encoding the coding block is reduced; and since only one constrained string mode is used, the string matching accuracy in the encoding process is improved, thereby reducing the number of matching parameters exist in a string-matching mode and the number of bits consumed to encode a coding block.

In an optional implementation mode of the present embodiment, the data to be compressed involved in the present embodiment includes at least one of one-dimensional data, two-dimensional data, multi-dimensional data, picture, a sequence of pictures, a video, an audio, a file, a set of bytes, a set of bits, a set of pixels or a set of pixel components.

In addition, the coding block in the present embodiment is a coding region of picture and the coding block involved in the present embodiment includes at least one of picture, a sub-picture of the picture, a macroblock, a largest coding unit (LCU), a coding tree unit (CTU), a coding unit (CU), a sub-region of the CU, a prediction unit (PU) or a transform unit (TU).

In addition, the constrained string mode involved in the present embodiment includes: one preset constraint condition; a plurality of preset constraint conditions; or no preset constraint conditions. When a plurality of constrained string modes are preset, a plurality of preset constraint conditions corresponding to the plurality of constrained string modes may overlap, or a plurality of preset constraint conditions corresponding to the plurality of constrained string modes do not overlap. For example, when three constrained string modes are preset, a first constrained string mode has one preset constraint condition, a second constrained string mode has two preset constraint conditions, and a third constrained string mode has no preset constraint condition. In this case, the preset constraint condition corresponding to the first constrained string mode and the preset constraint conditions corresponding to the second constrained string mode may overlap, or the preset constraint conditions corresponding to the second constrained string mode and the preset constraint conditions corresponding to the third constrained string mode may do not overlap. However, it is not limited to this case.

The preset constraint condition of the constrained string mode involved in the present embodiment includes one basic constraint condition or a combination of a plurality of basic constraint conditions. The factors relevant to a basic constraint condition include: a reference sample of the coding block, a length and a displacement vector of a string, and a shape of the coding block.

In an optional implementation mode of the present embodiment, the factors relevant to the basic constraint condition are exemplarily illustrated below.

Basic constraint conditions related to the reference sample of the coding block may include the basic constraint conditions described below.

A basic constraint condition 1: A string of at least one reference sample taken within a preset range from a reference position has a length with an upper limit and/or a lower limit.

In a specific application scenario, the basic constraint condition 1 may be as follows: for an original string (a string involved in the present embodiment), the reference string (i.e., the reference sample) of the original string is a string located within one preset range, the reference string may be represented by a reference position, and the original string with the above characteristics has a length of L and L has an upper limit and/or a lower limit.

A basic constraint condition 2: A string of at least one reference sample taken within a preset range from a reference position has a length limited to a group of preset values.

In a specific application scenario, the basic constraint condition 2 is substantially identical to the basic constraint condition 1 and the difference is that L is a certain value in a group of preset values.

A basic constraint condition 3: In one coding block, the number of strings of at least one reference sample taken from a preset reference set or a preset reference subset has an upper limit.

In a specific application scenario, the basic constraint condition 3 may be as follows: for an original string, the reference string of the original string is a string located within one preset range and the number of strings having a same length as the original string with the above characteristics is N and N has an upper limit.

A basic constraint condition 4: In one coding block, the number of strings of at least one reference sample taken within a preset range from a reference position has an upper limit.

In a specific application scenario, the basic constraint condition 4 is similar to the basic constraint condition 3 and the difference is that "the number of strings" (with an upper limit) is defined here rather than "reference samples" coming from a "number".

Basic constraint conditions related to the string length may include the basic constraint conditions described below.

A basic constraint condition 5: A string has a length equal to a number of samples of a coding block.

A basic constraint condition 6: A string has a length equal to half a number of samples of a coding block.

A basic constraint condition 7: A string has a length equal to a preset value.

A basic constraint condition 8: A string has a length limited to a group of preset values.

It can be known from the above basic constraint conditions 5 to 8 that the string length may be a preset value or has a group of preset values, or may be related to samples of the coding block. For example, the string length is equal to the number of samples of the coding block or the string length is equal to half the number of samples of the coding block.

Basic constraint conditions related to the shape of the coding block and the string length may include the basic constraint conditions described below.

A basic constraint condition 9: A coding block is a square and a string has a length equal to a side of the square.

A basic constraint condition 10: A coding block is a rectangle and a string has a length equal to a length or a width of the rectangle.

Basic constraint conditions related to the displacement vector of the string, the shape of the coding block, the string length or the reference sample may include the basic constraint conditions described below.

A basic constraint condition 11: A string has a displacement vector equal to a preset value.

A basic constraint condition 12: A string has a displacement vector limited to a group of preset values.

A basic constraint condition 13: A coding block is a square, a displacement vector of a string is equal to (0, 1) in horizontal scanning and (1, 0) in vertical scanning, and the displacement vector is equal to a side of the square after being converted to an equivalent one-dimensional offset.

A basic constraint condition 14: A coding block is a rectangle, a displacement vector of a string is equal to (0, 1) in horizontal scanning and (1, 0) in vertical scanning, and the displacement vector is equal to a length or a width of the rectangle after being converted to an equivalent one-dimensional offset.

A basic constraint condition 15: A string has a length limited to a preset value or a group of preset values, and a string has a displacement vector limited to a preset value or a group of preset values.

A basic constraint condition 16: A reference string has a length equal to 1 and has only one reference sample, and a current string has a length greater than or equal to 1, and all current samples are equal to the reference sample.

A basic constraint condition 17: At least one reference sample is located within a current block.

A basic constraint condition 18: A coding block is two-dimensional and of all strings each is vertical and has a starting point and an ending point at edges of the coding block.

A basic constraint condition 19: A coding block is two-dimensional and of all strings each is horizontal and has a starting point and an ending point at edges of the coding block.

On the basis of the above basic constraint conditions, the constrained string mode involved in the present embodiment may include one of or a combination of the above basic constraint conditions 1 to 19.

It can be known from the above basic constraint conditions that the constrained string in the present embodiment refers to a string constrained by a preset basic constraint condition. When a constrained string-matching mode is used for encoding one coding block, a constrained string mode of the coding block means that all strings in the coding block are constrained strings constrained by one preset constraint condition or a group of preset constraint conditions. Different constrained string modes have one different preset constraint condition or a different group of preset constraint conditions. Under the constraint of one preset constraint condition or a group of preset constraint conditions, the type and number of optional strings are greatly reduced so that the number and/or the value range of matching parameters and the number of bits consumed to encode the coding block are also greatly reduced.

It is to be noted that in the basic constraint condition 1, the preset range from the reference position is a region range including a CTU where the current block exists and K neighboring CTUs, and the length of the string has an upper limit of 32 and/or a lower limit of 1; and in the basic constraint condition 3, the preset reference set or the preset reference subset is a main reference set, and the upper limit of a total number of the strings is a total number of samples of the current block multiplied by a fraction M/N, where M and N both are positive integers.

On the basis of the above basic constraint conditions, in an optional implementation mode of the present embodiment, the plurality of preset constrained string modes includes three constrained string modes. A first constrained string mode includes the basic constraint condition 1 and the basic constraint condition 3. A second constrained string mode includes the basic constraint condition 5 and the basic constraint condition 6. A third constrained string mode includes the basic constraint condition 13, the basic constraint condition 16 and the basic constraint condition 17.

In another optional implementation mode of the present embodiment, the plurality of preset constrained string modes includes four constrained string modes. A first constrained string mode includes the basic constraint condition 1 and the basic constraint condition 3. A second constrained string mode includes the basic constraint condition 5 and the basic constraint condition 6. A third constrained string mode includes the basic constraint condition 13, the basic constraint condition 16 and the basic constraint condition 17. A fourth constrained string mode includes the basic constraint condition 18 and the basic constraint condition 19.

In another optional implementation mode of the present embodiment, the bitstream includes at least one enable flag indicating the string-matching mode of the plurality of constrained string modes. A position of the enable flag in the bitstream includes at least one of: a sequence parameter set, picture parameter set, a slice header, a CTU header, a CU header and a coding block header.

As for the enable flag, when the string-matching encoding is performed on the coding block in the plurality of constrained string modes, a direct or indirect identification element is used in the header information of the coding block for indicating which constrained string mode so that an optimal constrained string mode may be adaptively selected according to data characteristics of a coding-encoding block, thereby achieving high string-matching accuracy, reducing the number of consumed bits, and greatly improving encoding efficiency.

In addition, the plurality of preset constrained string modes involved in the present embodiment are represented by a plurality of preset values. Each constrained string mode corresponds to a respective preset value k, and the coding block has a constrained string mode identification element presented in the bitstream directly, indirectly, or directly and indirectly. When the constrained string mode identification element is equal to k, a constrained string mode corresponding to k is used for performing the string-matching encoding on the coding block.

A constrained string mode identification element presented directly includes one or more bits in the bitstream. A constrained string mode identification element presented indirectly is derived from another coding parameter and/or another syntax element in the bitstream. A constrained string mode identification element presented directly and indirectly is obtained by mixing a part presented directly of the constrained string mode identification element and a part presented indirectly of the constrained string mode identification element. In the above, k is a positive integer.

It is to be noted that a syntax element of the constrained string mode identification element indicating a constrained string mode of the coding block exists in the bitstream of the coding block in the following forms:

coding block header information, the constrained string mode identification element, a syntax element of a sample string or an unmatched sample; or, the coding block header information, a part of the constrained string mode identification element, a part of a syntax element of a first sample string, a remaining part of the constrained string mode identification element, the syntax element of the sample string or the unmatched sample. A constrained string mode corresponding to the constrained string mode identification element is used for performing the string-matching encoding on the coding block.

Embodiment 2

Figure 2:
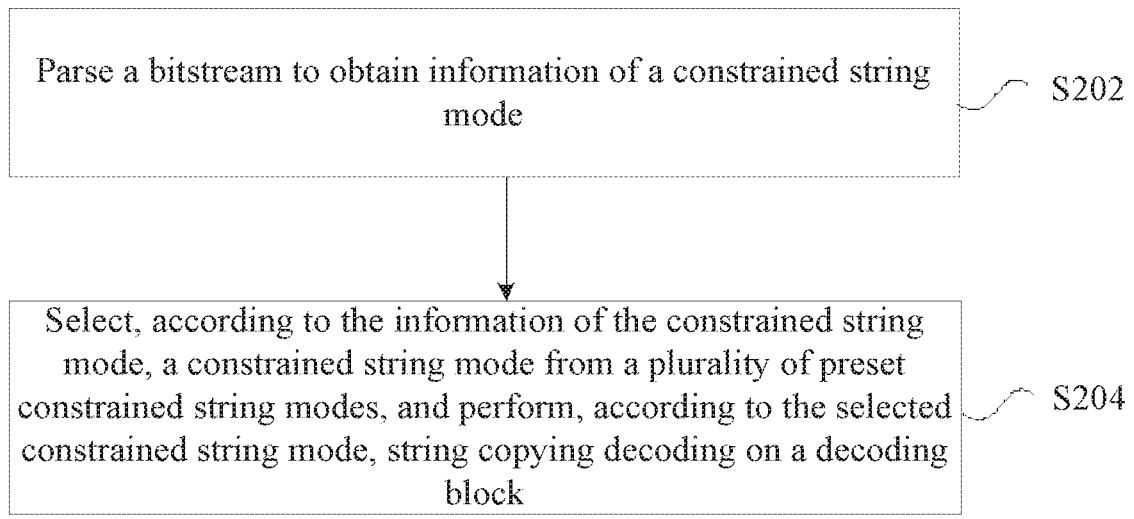
FIG. 2 is a flowchart 2 of a decoding method for data compression according to an embodiment of the present disclosure.

FIG. 2 is a flowchart of a decoding method for data compression according to an embodiment of the present disclosure. As shown in FIG. 2, the method includes the steps described below.

In step S202, a bitstream is parsed to obtain information of a constrained string mode.

In step S204, according to the information of the constrained string mode, a constrained string mode is selected from a plurality of preset constrained string modes, and string copying decoding is performed on a decoding block according to the selected constrained string mode.

In an optional implementation mode of the present embodiment, the data to be decoded involved in the present embodiment includes at least one of one-dimensional data, two-dimensional data, multi-dimensional data, picture, a sequence of pictures, a video, an audio, a file, a set of bytes, a set of bits, a set of pixels or a set of pixel components.

In addition, the coding block in the present embodiment is a coding region of picture and the coding block involved in the present embodiment includes at least one of picture, a sub-picture of the picture, a macroblock, a largest coding unit (LCU), a coding tree unit (CTU), a coding unit (CU), a sub-region of the CU, a prediction unit (PU) and a transform unit (TU).

In addition, the constrained string mode involved in the present embodiment includes: one preset constraint condition; a plurality of preset constraint conditions; or no preset constraint conditions. When a plurality of constrained string modes are preset, a plurality of preset constraint conditions corresponding to the plurality of constrained string modes overlap, or a plurality of preset constraint conditions corresponding to the plurality of constrained string modes do not overlap. For example, when three constrained string modes are preset, a first constrained string mode has one preset constraint condition, a second constrained string mode has two preset constraint conditions, and a third constrained string mode has no preset constraint condition. In this case, the preset constraint conditions corresponding to the first constrained string mode and the preset constraint conditions corresponding to the second constrained string mode may overlap, or the preset constraint conditions corresponding to the second constrained string mode and the preset constraint conditions corresponding to the third constrained string mode may do not overlap. However, it is not limited to this case.

The preset constraint condition of the constrained string mode involved in the present embodiment includes one basic constraint condition or a combination of a plurality of basic constraint conditions. The factors relevant to a basic constraint condition include a reference sample of the coding block, a length and a displacement vector of a string and a shape of the coding block.

In an optional implementation mode of the present embodiment, the factors relevant to the basic constraint condition are exemplarily illustrated below.

Basic constraint conditions related to the reference sample of the coding block may include the basic constraint conditions described below.

A basic constraint condition 1: A string of at least one reference sample taken within a preset range from a reference position has a length with an upper limit and/or a lower limit.

In a specific application scenario, the basic constraint condition 1 may be as follows: for an original string (a string involved in the present embodiment), the reference string (i.e., the reference sample) of the original string is a string located within one preset range, the reference string may be represented by a reference position, and the original string with the above characteristics has a length of L and L has an upper limit and/or a lower limit.

A basic constraint condition 2: A string of at least one reference sample taken within a preset range from a reference position has a length limited to a group of preset values.

In a specific application scenario, the basic constraint condition 2 is substantially identical to the basic constraint condition 1 and the difference is that L is a certain value in a group of preset values.

A basic constraint condition 3: In one coding block, the number of strings of at least one reference sample taken from a preset reference set or a preset reference subset has an upper limit.

In a specific application scenario, the basic constraint condition 3 may be as follows: for an original string, the reference string of the original string is a string located within one preset range and the number of strings having a same length as the original string with the above characteristics is N and N has an upper limit.

A basic constraint condition 4: In one coding block, the number of strings of at least one reference sample taken within a preset range from a reference position has an upper limit.

In a specific application scenario, the basic constraint condition 4 is similar to the basic constraint condition 3 and the difference is that "the number of strings" (with an upper limit) is defined here rather than "reference samples" coming from a "number".

Basic constraint conditions related to the string length may include the basic constraint conditions described below.

A basic constraint condition 5: A string has a length equal to a number of samples of a coding block.

A basic constraint condition 6: A string has a length equal to half a number of samples of a coding block.

A basic constraint condition 7: A string has a length equal to a preset value.

A basic constraint condition 8: A string has a length limited to a group of preset values.

It can be known from the above basic constraint conditions 5 to 8 that the string length may be a preset value or has a group of preset values, or may be related to samples of the coding block. For example, the string length is equal to the number of samples of the coding block or the string length is equal to half the number of samples of the coding block.

Basic constraint conditions related to the shape of the coding block and the string length may include the basic constraint conditions described below.

A basic constraint condition 9: A coding block is a square and a string has a length equal to a side of the square.

A basic constraint condition 10: A coding block is a rectangle and a string has a length equal to a length or a width of the rectangle.

Basic constraint conditions related to the displacement vector of the string, the shape of the coding block, the string length and the reference sample may include the basic constraint conditions described below.

A basic constraint condition 11: A string has a displacement vector equal to a preset value.

A basic constraint condition 12: A string has a displacement vector limited to a group of preset values.

A basic constraint condition 13: A coding block is a square, a displacement vector of a string is equal to (0, 1) in horizontal scanning and (1, 0) in vertical scanning, and the displacement vector is equal to a side of the square after being converted to an equivalent one-dimensional offset.

A basic constraint condition 14: A coding block is a rectangle, a displacement vector of a string is equal to (0, 1) in horizontal scanning and (1, 0) in vertical scanning, and the displacement vector is equal to a length or a width of the rectangle after being converted to an equivalent one-dimensional offset.

A basic constraint condition 15: A string has a length limited to a preset value or a group of preset values, and a string has a displacement vector limited to a preset value or a group of preset values.

A basic constraint condition 16: A reference string has a length equal to 1 and has only one reference sample, and a current string has a length greater than or equal to 1, and all current samples are equal to the reference sample.

A basic constraint condition 17: At least one reference sample is located within a current block.

A basic constraint condition 18: A coding block is two-dimensional, and all strings each is vertical and has a starting point and an ending point at edges of the coding block.

A basic constraint condition 19: A coding block is two-dimensional and of all strings each is horizontal and has a starting point and an ending point at edges of the coding block.

On the basis of the above basic constraint conditions, the constrained string mode involved in the present embodiment may include one of or a combination of the above basic constraint conditions 1 to 19.

It can be known from the above basic constraint conditions that the constrained string in the present embodiment refers to a string constrained by a preset basic constraint condition. When a constrained string-matching mode is used for encoding one coding block, a constrained string mode of the coding block means that all strings in the coding block are constrained strings constrained by one preset constraint condition or a group of preset constraint conditions. Different constrained string modes have one different preset constraint condition or a different group of preset constraint conditions. Under the constraint of one preset constraint condition or a group of preset constraint conditions, the type and number of optional strings are greatly reduced so that the number and/or the value range of matching parameters and the number of bits consumed to encode the coding block are also greatly reduced.

It is to be noted that in the basic constraint condition 1, the preset range from the reference position is a region range including a CTU where the current block exists and K neighboring CTUs, and the length of the string has an upper limit of 32 and/or a lower limit of 1; and in the basic constraint condition 3, the preset reference set or the preset reference subset is a main reference set, and the upper limit of a total number of the strings is a total number of samples of the current block multiplied by a fraction M/N, where M and N both are positive integers.

On the basis of the above basic constraint conditions, in an optional implementation mode of the present embodiment, the plurality of preset constrained string modes includes three constrained string modes. A first constrained string mode includes the basic constraint condition 1 and the basic constraint condition 3. A second constrained string mode includes the basic constraint condition 5 and the basic constraint condition 6. A third constrained string mode includes the basic constraint condition 13, the basic constraint condition 16 and the basic constraint condition 17.

In another optional implementation mode of the present embodiment, the plurality of preset constrained string modes includes four constrained string modes. A first constrained string mode includes the basic constraint condition 1 and the basic constraint condition 3. A second constrained string mode includes the basic constraint condition 5 and the basic constraint condition 6. A third constrained string mode includes the basic constraint condition 13, the basic constraint condition 16 and the basic constraint condition 17. A fourth constrained string mode includes the basic constraint condition 18 and the basic constraint condition 19.

In another optional implementation mode of the present embodiment, the decoded data stream includes at least one enable flag indicating the string-matching mode of the plurality of constrained string modes. A position of the enable flag in the decoded data stream includes at least one of: a sequence parameter set, picture parameter set, a slice header, a CTU header, a CU header and a coding block header.

As for the enable flag, when the string-matching encoding is performed on the coding block in the plurality of constrained string modes, a direct or indirect identification element is used in the header information of the coding block for indicating which constrained string mode so that an optimal constrained string mode may be adaptively selected according to data characteristics of a coding-encoding block, thereby achieving high string-matching accuracy, reducing the number of consumed bits, and greatly improving encoding efficiency.

In addition, the plurality of preset constrained string modes involved in the present embodiment are represented by a plurality of preset values. Each constrained string mode corresponds to a respective preset value k, and the coding block has a constrained string mode identification element presented in the decoded data stream directly, indirectly, or directly and indirectly. When the constrained string mode identification element is equal to k, a constrained string mode corresponding to k is used for performing the string-matching encoding on the coding block.

A directly-presented constrained string mode identification element presented directly includes one or more bits in the decoded data stream. An indirectly-presented constrained string mode identification element is derived from another coding parameter and/or another syntax element in the decoded data stream. A directly-indirectly-presented constrained string mode identification element is obtained by mixing a directly-presented part of the constrained string mode identification element and an indirectly-presented part of the constrained string mode identification element. In the above, k is a positive integer.

It is to be noted that a syntax element of the constrained string mode identification element indicating a constrained string mode of the coding block exists in the decoded data stream of the coding block in the following forms:

coding block header information, the constrained string mode identification element, a syntax element of a sample string or an unmatched sample; or, the coding block header information, a part of the constrained string mode identification element, a part of a syntax element of a first sample string, a remaining part of the constrained string mode identification element, the syntax element of the sample string or the unmatched sample. A constrained string mode corresponding to the constrained string mode identification element is used for performing the string-matching encoding on the coding block.

It is to be noted that the embodiment 2 illustrates a decoding method corresponding to the encoding method in the embodiment 1.

From the description of the embodiments described above, it will be apparent to those skilled in the art that the method of any embodiment described above may be implemented by means of software plus a necessary general-purpose hardware platform, or may of course be implemented by hardware; but in many cases, the former is a preferred implementation mode. Based on this understanding, the present disclosure substantially may be embodied in the form of a software product. The computer software product is stored in a storage medium (such as a ROM/RAM, a magnetic disk or an optical disk) and includes instructions for enabling a terminal device (which may be a mobile phone, a computer, a server, a network device, or the like) to execute the method according to embodiments of the present disclosure.

Embodiment 3

The present embodiment further provides an encoding device for data compression. The device is used for implementing the above-mentioned embodiments and preferred embodiments. What has been described will not be repeated. As used below, the term "module" may be software, hardware or a combination thereof capable of implementing preset functions. The device in the embodiments described below is preferably implemented by software, but implementation by hardware or by a combination of software and hardware is also possible and conceived.

Figure 3:
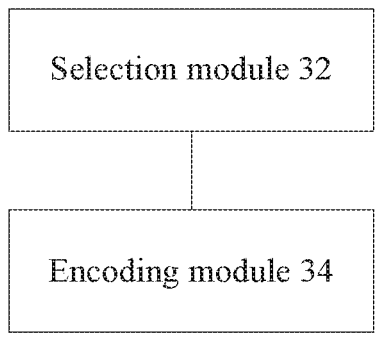
FIG. 3 is a block diagram 1 of an encoding device for data compression according to an embodiment of the present disclosure.

FIG. 3 is a block diagram of an encoding device for data compression according to an embodiment of the present disclosure. As illustrated in FIG. 3, the device includes: a selection module 32, which is configured to adaptively select a constrained string mode from a plurality of preset constrained string modes; and an encoding module 34, which is coupled to the selection module 32 and configured to perform, according to the selected constrained string mode, string-matching encoding on a coding block to obtain information of a constrained string encoded in the selected constrained string mode and to obtain a bitstream of a syntax element of the constrained string encoded in the selected constrained string mode.

In an optional implementation mode of the present embodiment, the data to be compressed involved in the present embodiment includes at least one of one-dimensional data, two-dimensional data, multi-dimensional data, picture, a sequence of pictures, a video, an audio, a file, a set of bytes, a set of bits, a set of pixels or a set of pixel components.

In addition, the coding block in the present embodiment is a coding region of picture and the coding block involved in the present embodiment includes at least one of picture, a sub-picture of the picture, a macroblock, a largest coding unit (LCU), a coding tree unit (CTU), a coding unit (CU), a sub-region of the CU, a prediction unit (PU) or a transform unit (TU).

In addition, the constrained string mode involved in the present embodiment includes: one preset constraint condition; a plurality of preset constraint conditions; or no preset constraint conditions. When a plurality of constrained string modes are preset, a plurality of preset constraint conditions corresponding to the plurality of constrained string modes may overlap, or a plurality of preset constraint conditions corresponding to the plurality of constrained string modes do not overlap. For example, when three constrained string modes are preset, a first constrained string mode has one preset constraint condition, a second constrained string mode has two preset constraint conditions, and a third constrained string mode has no preset constraint condition. In this case, the preset constraint conditions corresponding to the first constrained string mode and the preset constraint conditions corresponding to the second constrained string mode may overlap, or the preset constraint conditions corresponding to the second constrained string mode and the preset constraint conditions corresponding to the third constrained string mode may do not overlap. However, it is not limited to this case.

The preset constraint condition of the constrained string mode involved in the present embodiment includes one basic constraint condition or a combination of a plurality of basic constraint conditions. The factors relevant to a basic constraint condition include a reference sample of the coding block, a length and a displacement vector of a string and a shape of the coding block.

In an optional implementation mode of the present embodiment, the factors relevant to the basic constraint condition are exemplarily illustrated below.

Basic constraint conditions related to the reference sample of the coding block may include the basic constraint conditions described below.

A basic constraint condition 1: A string of at least one reference sample taken within a preset range from a reference position has a length with an upper limit and/or a lower limit.

In a specific application scenario, the basic constraint condition 1 may be as follows: for an original string (a string involved in the present embodiment), the reference string (i.e., the reference sample) of the original string is a string located within one preset range, the reference string may be represented by a reference position, and the original string with the above characteristics has a length of L and L has an upper limit and/or a lower limit.

A basic constraint condition 2: A string of at least one reference sample taken within a preset range from a reference position has a length limited to a group of preset values.

In a specific application scenario, the basic constraint condition 2 is substantially identical to the basic constraint condition 1 and the difference is that L is a certain value in a group of preset values.

A basic constraint condition 3: In one coding block, the number of strings of at least one reference sample taken from a preset reference set or a preset reference subset has an upper limit.

In a specific application scenario, the basic constraint condition 3 may be as follows: for an original string, the reference string of the original string is a string located within one preset range and the number of strings having a same length as the original string with the above characteristics is N and N has an upper limit.

A basic constraint condition 4: In one coding block, the number of strings of at least one reference sample taken within a preset range from a reference position has an upper limit.

In a specific application scenario, the basic constraint condition 4 is similar to the basic constraint condition 3 and the difference is that "the number of string" (with an upper limit) is defined here rather than "reference samples" coming from a "number".

Basic constraint conditions related to the string length may include the basic constraint conditions described below.

A basic constraint condition 5: A string has a length equal to a number of samples of a coding block.

A basic constraint condition 6: A string has a length equal to half a number of samples of a coding block.

A basic constraint condition 7: A string has a length equal to a preset value.

A basic constraint condition 8: A string has a length limited to a group of preset values.

It can be known from the above basic constraint conditions 5 to 8 that the string length may be a preset value or has a group of preset values, or may be related to samples of the coding block. For example, the string length is equal to the number of samples of the coding block or the string length is equal to half the number of samples of the coding block.

Basic constraint conditions related to the shape of the coding block and the string length may include the basic constraint conditions described below.

A basic constraint condition 9: A coding block is a square and a string has a length equal to a side of the square.

A basic constraint condition 10: A coding block is a rectangle and a string has a length equal to a length or a width of the rectangle.

Basic constraint conditions related to the displacement vector of the string, the shape of the coding block, the string length and the reference sample may include the basic constraint conditions described below.

A basic constraint condition 11: A string has a displacement vector equal to a preset value.

A basic constraint condition 12: A string has a displacement vector limited to a group of preset values.

A basic constraint condition 13: A coding block is a square, a displacement vector of a string is equal to (0, 1) in horizontal scanning and (1, 0) in vertical scanning, and the displacement vector is equal to a side of the square after being converted to an equivalent one-dimensional offset.

A basic constraint condition 14: A coding block is a rectangle, a displacement vector of a string is equal to (0, 1) in horizontal scanning and (1, 0) in vertical scanning, and the displacement vector is equal to a length or a width of the rectangle after being converted to an equivalent one-dimensional offset.

A basic constraint condition 15: A string has a length limited to a preset value or a group of preset values, and a string has a displacement vector limited to a preset value or a group of preset values.

A basic constraint condition 16: A reference string has a length equal to 1 and has only one reference sample, and a current string has a length greater than or equal to 1, and all current samples are equal to the reference sample.

A basic constraint condition 17: At least one reference sample is located within a current block.

A basic constraint condition 18: A coding block is two-dimensional and of all strings each is vertical and has a starting point and an ending point at edges of the coding block.

A basic constraint condition 19: A coding block is two-dimensional and of all strings each is horizontal and has a starting point and an ending point at edges of the coding block.

On the basis of the above basic constraint conditions, the constrained string mode involved in the present embodiment may include one of or a combination of the above basic constraint conditions 1 to 19.

It can be known from the above basic constraint conditions that the constrained string in the present embodiment refers to a string constrained by a preset basic constraint condition. When a constrained string-matching mode is used for encoding one coding block, a constrained string mode of the coding block means that all strings in the coding block are constrained strings constrained by one preset constraint condition or a group of preset constraint conditions. Different constrained string modes have one different preset constraint condition or a different group of preset constraint conditions. Under the constraint of one preset constraint condition or a group of preset constraint conditions, the type and number of optional strings are greatly reduced so that the number and/or the value range of matching parameters and the number of bits consumed to encode the coding block are also greatly reduced.

It is to be noted that in the basic constraint condition 1, the preset range from the reference position is a region range including a CTU where the current block exists and K neighboring CTUs, and the length of the string has an upper limit of 32 and/or a lower limit of 1; and in the basic constraint condition 3, the preset reference set or the preset reference subset is a main reference set, and the upper limit of a total number of the strings is a total number of samples of the current block multiplied by a fraction M/N, where M and N both are positive integers.

On the basis of the above basic constraint conditions, in an optional implementation mode of the present embodiment, the plurality of preset constrained string modes includes three constrained string modes. A first constrained string mode includes the basic constraint condition 1 and the basic constraint condition 3. A second constrained string mode includes the basic constraint condition 5 and the basic constraint condition 6. A third constrained string mode includes the basic constraint condition 13, the basic constraint condition 16 and the basic constraint condition 17.

In another optional implementation mode of the present embodiment, the plurality of preset constrained string modes includes four constrained string modes. A first constrained string mode includes the basic constraint condition 1 and the basic constraint condition 3. A second constrained string mode includes the basic constraint condition 5 and the basic constraint condition 6. A third constrained string mode includes the basic constraint condition 13, the basic constraint condition 16 and the basic constraint condition 17. A fourth constrained string mode includes the basic constraint condition 18 and the basic constraint condition 19.

In another optional implementation mode of the present embodiment, the bitstream includes at least one enable flag indicating the string-matching mode of the plurality of constrained string modes. A position of the enable flag in the bitstream includes at least one of: a sequence parameter set, picture parameter set, a slice header, a CTU header, a CU header or a coding block header.

As for the enable flag, when the string-matching encoding is performed on the coding block in the plurality of constrained string modes, a direct or indirect identification element is used in the header information of the coding block for indicating which constrained string mode so that an optimal constrained string mode may be adaptively selected according to data characteristics of a coding-encoding block, thereby achieving high string-matching accuracy, reducing the number of consumed bits, and greatly improving encoding efficiency.

In addition, the plurality of preset constrained string modes involved in the present embodiment are represented by a plurality of preset values. Each constrained string mode corresponds to a respective preset value k, and the coding block has a constrained string mode identification element presented in the bitstream directly, indirectly, or directly and indirectly. When the constrained string mode identification element is equal to k, a constrained string mode corresponding to k is used for performing the string-matching encoding on the coding block.

A directly-presented constrained string mode identification element includes one or more bits in the bitstream. An indirectly-presented constrained string mode identification element is derived from another coding parameter and/or another syntax element in the bitstream. A directly-indirectly-presented constrained string mode identification element is obtained by mixing a directly-presented part of the constrained string mode identification element and an indirectly-presented part of the constrained string mode identification element. In the above, k is a positive integer.

It is to be noted that a syntax element of the constrained string mode identification element indicating a constrained string mode of the coding block exists in the bitstream of the coding block in the following forms:

coding block header information, the constrained string mode identification element, a syntax element of a sample string or an unmatched sample; or, the coding block header information, a part of the constrained string mode identification element, a part of a syntax element of a first sample string, a remaining part of the constrained string mode identification element, the syntax element of the sample string or the unmatched sample. A constrained string mode corresponding to the constrained string mode identification element is used for performing the string-matching encoding on the coding block.

Embodiment 4

Figure 4:
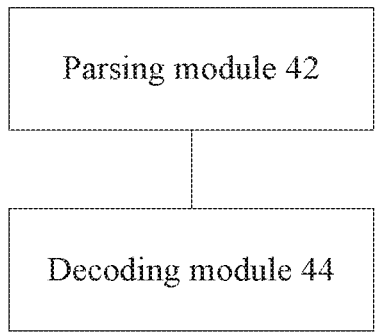
FIG. 4 is a block diagram 2 of a decoding device for data compression according to an embodiment of the present disclosure.

FIG. 4 is a block diagram of a decoding device for data compression according to an embodiment of the present disclosure. As illustrated in FIG. 4, the device includes: a parsing module 42, which is configured to parse a bitstream to obtain information of a constrained string mode; and a decoding module 44, which is coupled to the parsing module 42 and configured to select, according to the information of the constrained string mode, a constrained string mode from a plurality of preset constrained string modes and to perform, according to the selected constrained string mode, string copying decoding on a decoding block.

In an optional implementation mode of the present embodiment, the data to be decoded involved in the present embodiment includes at least one of one-dimensional data, two-dimensional data, multi-dimensional data, picture, a sequence of pictures, a video, an audio, a file, a set of bytes, a set of bits, a set of pixels or a set of pixel components.

In addition, the coding block in the present embodiment is a coding region of picture and the coding block involved in the present embodiment includes at least one of picture, a sub-picture of the picture, a macroblock, a largest coding unit (LCU), a coding tree unit (CTU), a coding unit (CU), a sub-region of the CU, a prediction unit (PU) or a transform unit (TU).

In addition, the constrained string mode involved in the present embodiment includes: one preset constraint condition; a plurality of preset constraint conditions; or no preset constraint conditions. When a plurality of constrained string modes are preset, a plurality of preset constraint conditions corresponding to the plurality of constrained string modes overlap, or a plurality of preset constraint conditions corresponding to the plurality of constrained string modes do not overlap. For example, when three constrained string modes are preset, a first constrained string mode has one preset constraint condition, a second constrained string mode has two preset constraint conditions, and a third constrained string mode has no preset constraint condition. In this case, the preset constraint conditions corresponding to the first constrained string mode and the preset constraint conditions corresponding to the second constrained string mode may overlap, or the preset constraint conditions corresponding to the second constrained string mode and the preset constraint conditions corresponding to the third constrained string mode may do not overlap. However, it is not limited to this case.

The preset constraint condition of the constrained string mode involved in the present embodiment includes one basic constraint condition or a combination of a plurality of basic constraint conditions. The factors relevant to a basic constraint condition include a reference sample of the coding block, a length and a displacement vector of a string and a shape of the coding block.

In an optional implementation mode of the present embodiment, the factors relevant to the basic constraint condition are exemplarily illustrated below.

Basic constraint conditions related to the reference sample of the coding block may include the basic constraint conditions described below.

A basic constraint condition 1: A string of at least one reference sample taken within a preset range from a reference position has a length with an upper limit and/or a lower limit.

In a specific application scenario, the basic constraint condition 1 may be as follows: for an original string (a string involved in the present embodiment), the reference string (i.e., the reference sample) of the original string is a string located within one preset range, the reference string may be represented by a reference position, and the original string with the above characteristics has a length of L and L has an upper limit and/or a lower limit.

A basic constraint condition 2: A string of at least one reference sample taken within a preset range from a reference position has a length limited to a group of preset values.

In a specific application scenario, the basic constraint condition 2 is substantially identical to the basic constraint condition 1 and the difference is that L is a certain value in a group of preset values.

A basic constraint condition 3: In one coding block, the number of strings of at least one reference sample taken from a preset reference set or a preset reference subset has an upper limit.

In a specific application scenario, the basic constraint condition 3 may be as follows: for an original string, the reference string of the original string is a string located within one preset range and the number of strings having a same length as the original string with the above characteristics is N and N has an upper limit.

A basic constraint condition 4: In one coding block, the number of strings of at least one reference sample taken within a preset range from a reference position has an upper limit.

In a specific application scenario, the basic constraint condition 4 is similar to the basic constraint condition 3 and the difference is that "the number of string" (with an upper limit) is defined here rather than "reference samples" coming from a "number".

Basic constraint conditions related to the string length may include the basic constraint conditions described below.

A basic constraint condition 5: A string has a length equal to a number of samples of a coding block.

A basic constraint condition 6: A string has a length equal to half a number of samples of a coding block.

A basic constraint condition 7: A string has a length equal to a preset value.

A basic constraint condition 8: A string has a length limited to a group of preset values.

It can be known from the above basic constraint conditions 5 to 8 that the string length may be a preset value or has a group of preset values, or may be related to samples of the coding block. For example, the string length is equal to the number of samples of the coding block or the string length is equal to half the number of samples of the coding block.

Basic constraint conditions related to the shape of the coding block and the string length may include the basic constraint conditions described below.

A basic constraint condition 9: A coding block is a square and a string has a length equal to a side of the square.

A basic constraint condition 10: A coding block is a rectangle and a string has a length equal to a length or a width of the rectangle.

Basic constraint conditions related to the displacement vector of the string, the shape of the coding block, the string length and the reference sample may include the basic constraint conditions described below.

A basic constraint condition 11: A string has a displacement vector equal to a preset value.

A basic constraint condition 12: A string has a displacement vector limited to a group of preset values.

A basic constraint condition 13: A coding block is a square, a displacement vector of a string is equal to (0, 1) in horizontal scanning and (1, 0) in vertical scanning, and the displacement vector is equal to a side of the square after being converted to an equivalent one-dimensional offset.

A basic constraint condition 14: A coding block is a rectangle, a displacement vector of a string is equal to (0, 1) in horizontal scanning and (1, 0) in vertical scanning, and the displacement vector is equal to a length or a width of the rectangle after being converted to an equivalent one-dimensional offset.

A basic constraint condition 15: A string has a length limited to a preset value or a group of preset values, and a string has a displacement vector limited to a preset value or a group of preset values.

A basic constraint condition 16: A reference string has a length equal to 1 and has only one reference sample, and a current string has a length greater than or equal to 1, and all current samples are equal to the reference sample.

A basic constraint condition 17: At least one reference sample is located within a current block.

A basic constraint condition 18: A coding block is two-dimensional and of all strings each is vertical and has a starting point and an ending point at edges of the coding block.

A basic constraint condition 19: A coding block is two-dimensional and of all strings each is horizontal and has a starting point and an ending point at edges of the coding block.

On the basis of the above basic constraint conditions, the constrained string mode involved in the present embodiment may include one of or a combination of the above basic constraint conditions 1 to 19.

It can be known from the above basic constraint conditions that the constrained string in the present embodiment refers to a string constrained by a preset basic constraint condition. When a constrained string-matching mode is used for encoding one coding block, a constrained string mode of the coding block means that all strings in the coding block are constrained strings constrained by one preset constraint condition or a group of preset constraint conditions. Different constrained string modes have one different preset constraint condition or a different group of preset constraint conditions. Under the constraint of one preset constraint condition or a group of preset constraint conditions, the type and number of optional strings are greatly reduced so that the number and/or the value range of matching parameters and the number of bits consumed to encode the coding block are also greatly reduced.

It is to be noted that in the basic constraint condition 1, the preset range from the reference position is a region range including a CTU where the current block exists and K neighboring CTUs, and the length of the string has an upper limit of 32 and/or a lower limit of 1; and in the basic constraint condition 3, the preset reference set or the preset reference subset is a main reference set, and the upper limit of a total number of the strings is a total number of samples of the current block multiplied by a fraction M/N, where M and N both are positive integers.

On the basis of the above basic constraint conditions, in an optional implementation mode of the present embodiment, the plurality of preset constrained string modes includes three constrained string modes. A first constrained string mode includes the basic constraint condition 1 and the basic constraint condition 3. A second constrained string mode includes the basic constraint condition 5 and the basic constraint condition 6. A third constrained string mode includes the basic constraint condition 13, the basic constraint condition 16 and the basic constraint condition 17.

In another optional implementation mode of the present embodiment, the plurality of preset constrained string modes includes four constrained string modes. A first constrained string mode includes the basic constraint condition 1 and the basic constraint condition 3. A second constrained string mode includes the basic constraint condition 5 and the basic constraint condition 6. A third constrained string mode includes the basic constraint condition 13, the basic constraint condition 16 and the basic constraint condition 17. A fourth constrained string mode includes the basic constraint condition 18 and the basic constraint condition 19.

In another optional implementation mode of the present embodiment, the decoded data stream includes at least one enable flag indicating the string-matching mode of the plurality of constrained string modes. A position of the enable flag in the decoded data stream includes at least one of: a sequence parameter set, picture parameter set, a slice header, a CTU header, a CU header and a coding block header.

As for the enable flag, when the string-matching encoding is performed on the coding block in the plurality of constrained string modes, a direct or indirect identification element is used in the header information of the coding block for indicating which constrained string mode so that an optimal constrained string mode may be adaptively selected according to data characteristics of a coding-encoding block, thereby achieving high string-matching accuracy, reducing the number of consumed bits, and greatly improving encoding efficiency.

In addition, the plurality of preset constrained string modes involved in the present embodiment are represented by a plurality of preset values. Each constrained string mode corresponds to a respective preset value k, and the coding block has a constrained string mode identification element presented in the decoded data stream directly, indirectly, or directly and indirectly. When the constrained string mode identification element is equal to k, a constrained string mode corresponding to k is used for performing the string-matching encoding on the coding block.

A directly-presented constrained string mode identification element includes one or more bits in the decoded data stream. An indirectly-presented constrained string mode identification element is derived from another coding parameter and/or another syntax element in the decoded data stream. A directly-indirectly-presented constrained string mode identification element is obtained by mixing a directly-presented part of the constrained string mode identification element and an indirectly-presented part of the constrained string mode identification element. In the above, k is a positive integer.

It is to be noted that a syntax element of the constrained string mode identification element indicating a constrained string mode of the coding block exists in the decoded data stream of the coding block in the following forms:

coding block header information, the constrained string mode identification element, a syntax element of a sample string or an unmatched sample; or, the coding block header information, a part of the constrained string mode identification element, a part of a syntax element of a first sample string, a remaining part of the constrained string mode identification element, the syntax element of the sample string or the unmatched sample. A constrained string mode corresponding to the constrained string mode identification element is used for performing the string-matching encoding on the coding block.

A detailed description of the present disclosure is given below in conjunction with specific embodiments of the embodiments of the present disclosure.

Embodiment 5

The present embodiment provides a method data compression, which performs string-matching encoding and decoding in a plurality of constrained string modes. In the string-matching mode, a constrained string refers to a string constrained by a preset constraint condition. When the string-matching mode is used for encoding and decoding one coding-decoding block, a constrained string mode of the coding-decoding block means that all strings in the coding-decoding block are constrained by one preset constraint condition or a group of preset constraint conditions. Different constrained string modes each has one different preset constraint condition or a different group of preset constraint conditions. Under the constraint of one preset constraint condition or a group of preset constraint conditions, the options for the type and number of strings are greatly reduced so that the number and/or the value ranges of matching parameters and the number of bits consumed to encode the coding block are also greatly reduced. When the string-matching encoding and the string copying decoding are performed on the coding-decoding block in a plurality of (at least two) constrained string modes, a direct or indirect identification element is used for indicating which constrained string mode is used by the coding-decoding block in the header information of the coding-decoding block so that an optimal constrained string mode may be adaptively selected according to data characteristics of the coding-decoding block, thereby achieving high string-matching accuracy, reducing the number of consumed bits, and greatly improving encoding efficiency.

In the present embodiment, the constrained string modes of a plurality of levels (two or more levels) of coding-decoding blocks are used for performing the string-matching encoding and the string copying decoding.

One constrained string mode may include one preset constraint condition. One constrained string mode may include a group of (two or more) preset constraint conditions. The one preset constraint condition includes one basic constraint condition or a combination of a plurality of basic constraint conditions.

In addition, the constrained string mode has zero preset constraint conditions, that is, there is no preset constraint condition. Two groups of preset constraint conditions in a plurality of groups of preset constraint conditions corresponding to the plurality of constrained string modes overlap; or two groups of preset constraint conditions in a plurality of groups of preset constraint conditions corresponding to the plurality of constrained string modes do not overlap.

In an encoding method in the present embodiment, a constrained string mode is adaptively selected from a plurality of constrained string modes according to characteristics of a current coding block to perform string-matching encoding on the current coding block and generate a bitstream at least including identification elements of the plurality of constrained string modes and matching parameters (copying parameters required for the decoding) of constrained strings corresponding to the identification elements.

In a decoding method of the present embodiment, a bitstream is parsed to obtain information of a constrained string mode and one of a plurality of preset constrained string modes is used according to the information of the constrained string mode for performing string copying decoding on a current decoding block.

It is to be noted that the present embodiment is applicable to the encoding and decoding for lossy data compression and the present disclosure is also applicable to the encoding and decoding for lossless data compression. The present embodiment is applicable to the encoding and decoding of one-dimensional data such as character string data or byte string data; the present disclosure is also applicable to the encoding and decoding of two-dimensional data or multi-dimensional data such as picture or video data.

Data involved in data compression includes one of or a combination of the following data:
 (1) one-dimensional data;
 (2) two-dimensional data;
 (3) multi-dimensional data;
 (4) picture;
 (5) a sequence of pictures;
 (6) a video;
 (7) an audio;
 (8) a file;
 (9) a set of bytes;
 (10) a set of bits;
 (11) a set of pixels; and
 (12) a set of pixel components.

In addition, in the present embodiment, when the data is picture, a sequence of pictures or a video, the coding block or decoding block is a coding region or a decoding region of picture and includes at least one of a sub-picture of the picture, a macroblock, a largest coding unit (LCU), a coding tree unit (CTU), a coding unit (CU), a sub-region of the CU, a prediction unit (PU) or a transform unit (TU).

The constrained string mode involved in the present embodiment has one of or a reasonable combination of the following characteristics: the one constrained string mode has a preset constraint condition; the one constrained string mode has a plurality of (two or more) preset constraint conditions; the one constrained string mode has at least one preset constraint condition and the preset constraint condition includes one basic constraint condition or a logical combination of the plurality of basic constraint conditions; the one constrained string mode has zero preset constraint conditions, that is, there is no preset constraint condition; two groups of preset constraint conditions in a plurality of groups of preset constraint conditions corresponding to the plurality of constrained string modes overlap; or two groups pf preset constraint conditions in a plurality of groups of preset constraint conditions corresponding to the plurality of constrained string modes do not overlap.

A detailed description of specific optional implementation modes in the present embodiment is given below.

Optional Implementation Mode 1

A preset constraint condition of the constrained string mode involved in the present embodiment includes one basic constraint condition or a combination of a plurality of basic constraint conditions described below.

A basic constraint condition 1: A string of at least one reference sample taken within a preset range from a reference position has a length with a preset upper limit and/or a preset lower limit.

A basic constraint condition 2: A string of at least one reference sample taken within a preset range from a reference position has a length limited to a group of preset values.

A basic constraint condition 3: In one coding-decoding block, a number of strings of at least one reference sample taken from a preset reference set or a preset reference subset has a preset upper limit.

A basic constraint condition 4: In one coding-decoding block, a number of strings of at least one reference sample taken within a preset range from a reference position has a preset upper limit.

A basic constraint condition 5: A string has a length equal to a number of samples of a coding-encoding block.

A basic constraint condition 6: A string has a length equal to half a number of samples of a coding-encoding block.

A basic constraint condition 7: A string has a length equal to a preset value.

A basic constraint condition 8: A string has a length limited to a group of preset values.

A basic constraint condition 9: A coding-encoding block is a square and a string has a length equal to a side of the square.

A basic constraint condition 10: A coding-encoding block is a rectangle and a string has a length equal to a length or a width of the rectangle.

A basic constraint condition 11: A string has a displacement vector equal to a preset value.

A basic constraint condition 12: A string has a displacement vector limited to a group of preset values.

A basic constraint condition 13: A coding-encoding block is a square, a displacement vector (horizontal component and vertical component) of a string is equal to (0, 1) in horizontal scanning and (1, 0) in vertical scanning, and the displacement vector is equal to a side of the square after being converted to an equivalent one-dimensional offset.

A basic constraint condition 14: A coding-encoding block is a rectangle, a displacement vector (horizontal component and vertical component) of a string is equal to (0, 1) in horizontal scanning and (1, 0) in vertical scanning, and the displacement vector is equal to a length or width of the rectangle after being converted to an equivalent one-dimensional offset.

A basic constraint condition 15: A string has a length limited to a preset value or a group of preset values, and a string has a displacement vector limited to a preset value or a group of preset values.

A basic constraint condition 16: A reference string has a length equal to 1 and has only one reference sample, and a current string has a length greater than or equal to 1, and all current samples are equal to the reference sample.

A basic constraint condition 17: At least one reference sample is located within a current block.

A basic constraint condition 18: A coding-encoding block is two-dimensional and of all strings each is vertical and has a starting point and an ending point at edges of the coding block.

A basic constraint condition 19: A coding-encoding block is two-dimensional and of all strings each is horizontal and has a starting point and an ending point at edges of the coding block.

Optional Implementation Mode 2

A plurality of preset constrained string modes includes the three constrained string modes described below.

A first constrained string mode includes the basic constraint condition 1 and the basic constraint condition 3. That is to say, a coding-encoding block in the first constrained string mode is subject to the following limitations: (1) If the reference samples of a string are taken within a preset range from a reference position, the string has a length with a preset upper limit and/or a preset lower limit. (2) In the coding-decoding block, the number of strings of at least reference sample taken from a preset reference set or a reference subset has a preset upper limit.

A second constrained string mode includes the basic constraint condition 5 and the basic constraint condition 6. That is to say, a coding-encoding block in the second constrained string mode is subject to the following limitations: In the coding-decoding block, only one string has a length equal to the number of samples of the coding-decoding block, or only two strings each has a length equal to half the number of samples of the coding-decoding block.

A third constrained string mode includes the basic constraint condition 13, the basic constraint condition 16 and the basic constraint condition 17. That is to say, a coding-encoding block in the third constrained string mode is subject to the following limitations: The coding-decoding block has a square shape, a displacement vector (horizontal component and vertical component) of any string is equal to (0, 1) in horizontal scanning and (1, 0) in vertical scanning, and the displacement vector is equal to a side of the square after being converted to an equivalent one-dimensional offset (that is, the current string of ant string is obtained by moving a reference string by one row or one column); or the current reference sample of any string is equal to one reference sample and all reference samples of the encoding-decoding are located within the coding-decoding block.

Optional Implementation Mode 3

The plurality of preset constrained string modes in the optional implementation mode 1 includes four constrained string modes. A first constrained string mode has the same preset constraint conditions as the first constrained string mode in the implementation mode 2.

A second constrained string mode has the same preset constraint conditions as the second constrained string mode in the implementation mode 2.

A third constrained string mode has the same preset constraint conditions as the third constrained string mode in the implementation mode 2.

A fourth constrained string mode includes the basic constraint condition 18 and the basic constraint condition 19. That is to say, a coding-encoding block in the fourth constrained string mode is subject to the following limitations: The encoding-decoding is two-dimensional, and each of all strings is vertical or horizontal and has a starting point and an ending point at edges of the block.

Optional Implementation Mode 4

In the above optional implementation modes 1-3, in the basic constraint condition 1, the preset range from the reference position is a region range including a CTU where the current block exists and K ($1 \leq K \leq 4$ in general cases) neighboring (left and/or top left and/or top and/or top right) CTUs, and a string has a length with a preset upper limit of 32 (inclusive) and a preset lower limit of 1 (inclusive); in the basic constraint condition 3, the reference set or the reference subset is a main reference set and the upper limit of the total number of strings is preset to the total number of samples of the current block multiplied by a fraction M/N ($1 \leq M < N \leq 16$ in general cases).

Optional Implementation Mode 5

In an encoding or decoding method, an enable flag indicating a string-matching mode of a plurality of constrained string modes is located in the following one or more positions of a bitstream:

(1) A sequence parameter set: Usually a syntax element directly existing in or implicitly derived from the sequence parameter set.

(2) Picture parameter set: Usually a syntax element directly existing in or implicitly derived from the picture parameter set.

(3) A slice header: Usually a syntax element directly existing in or implicitly derived from the slice header.

(4) A CTU header: Usually a syntax element directly existing in or implicitly derived from the CTU header.

(5) A CU header: Usually a syntax element directly existing in or implicitly derived from the CU header.

(6) A coding-encoding block header: Usually a syntax element directly existing in or implicitly derived from the coding-decoding block header.

Optional Implementation Mode 6

In an encoding or decoding method, a plurality of preset constrained string modes are represented by a plurality of preset values, each constrained string mode corresponds to a respective preset value k, and each coding-decoding block has a constrained string mode identification element presented in a bitstream directly, indirectly, or directly and indirectly.

If the constrained string mode identification element is equal to k,
{
A constrained string mode corresponding to k is used for performing string-matching encoding and string copying decoding on a coding-encoding block.
}

A constrained string mode identification element presented directly includes one or more bits in the bitstream. A constrained string mode identification element presented indirectly is derived from another encoding-decoding parameter and/or another syntax element in the bitstream. A constrained string mode identification element presented directly and indirectly is obtained by mixing a part presented directly of the constrained string mode identification element (including one or more bits in the bitstream) and a part presented indirectly of the constrained string mode identification element (derived from another encoding-decoding parameter and/or another syntax element in the bitstream).

Optional Implementation Mode 7

In an encoding or decoding method, a syntax element of a constrained string mode identification element indicating a constrained string mode of a coding-encoding block exists in a bitstream of the coding-decoding block in the following one form:

coding-decoding block header information, the constrained string mode identification element, more coding-decoding block header information, a syntax element of a sample string or an unmatched sample ($1 \leq N \leq$ the total number of samples of the coding-decoding block); or the coding-decoding block header information, a part of the constrained string mode identification element, more coding-decoding block header information, a part of a syntax element of a first sample string, a remaining part of the constrained string mode identification element, a remaining syntax element of the sample string or the unmatched sample ($1 \leq N \leq$ the total number of samples of the coding-decoding block).

When the constrained string mode identification element is equal to a value, a constrained string mode corresponding to the value is used for performing string-matching encoding and string copying decoding on the coding-decoding block.

In an embodiment, for specific examples in the present embodiment, reference may be made to the examples described in the above embodiments and optional implementation modes, and repetition will not be made in the present embodiment.

Apparently, those skilled in the art should know that each above-mentioned module or step of the present disclosure may be implemented by a general-purpose computing device, they may be concentrated on a single computing device or distributed on a network formed by multiple computing devices, and alternatively, they may be implemented by program codes executable by the computing devices, so that they may be stored in a storage device for execution by the computing devices, and in some circumstances, the illustrated or described steps may be executed in sequences different from those described herein, or they may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure are within the scope of the present disclosure.

INDUSTRIAL APPLICABILITY

In the encoding or decoding process in the embodiments of the present disclosure, a constrained string mode is adaptively selected from the plurality of preset constrained string modes and according to the selected constrained string mode, the string-matching encoding is performed on the coding block in data to be compressed to obtain the information of the constrained string encoded in the selected constrained string mode and to obtain the bitstream of the syntax element of the constrained string encoded in the selected constrained string mode. In this manner, since one constrained string mode is selected from the plurality of preset constrained string modes to encode the coding block in the data to be compressed, the number of matching parameters for encoding the coding block is reduced; and since only one constrained string mode is used, the string-matching accuracy in the encoding process is improved, thereby reducing the number of matching parameters exist in a string-matching mode and the number of bits consumed to encode a coding block.

What is claimed is:

1. An encoding method for data compression, comprising:

adaptively selecting a constrained string mode from a plurality of preset constrained string modes; and performing, according to the selected constrained string mode, string-matching encoding on a coding block to obtain information of a constrained string encoded in the selected constrained string mode and to obtain a bitstream of a syntax element of the constrained string encoded in the selected constrained string mode;

wherein the plurality of preset constrained string modes are represented by a plurality of preset values, wherein each constrained string mode corresponds to a respective preset value k, and the coding block includes a constrained string mode identification element presented in the bitstream directly, indirectly, or directly and indirectly; and when the constrained string mode identification element is equal to k, a constrained string mode corresponding to k is used for performing the string-matching encoding on the coding block;

wherein the method is performed by a hardware processor.

2. The method of claim 1, wherein the constrained string mode comprises:

one preset constraint condition; or a plurality of preset constraint conditions; or no preset constraint condition.

3. The method of claim 1, wherein a preset constraint condition of the constrained string mode comprises one basic constraint condition or a combination of a plurality of basic constraint conditions selected from a group consisting of:

a basic constraint condition 1: a string of at least one reference sample taken within a preset range from a reference position includes a length with an upper limit and/or a lower limit;

a basic constraint condition 2: a string of at least one reference sample taken within a preset range from a reference position includes a length limited to a group of preset values;

a basic constraint condition 3: in one coding block, a number of strings of at least one reference sample taken from a preset reference set or a preset reference subset includes an upper limit;

a basic constraint condition 4: in one coding block, a number of strings of at least one reference sample taken within a preset range from a reference position includes an upper limit;

a basic constraint condition 5: a string includes a length equal to a number of samples of a coding block;

a basic constraint condition 6: a string includes a length equal to half a number of samples of a coding block;

a basic constraint condition 7: a string includes a length equal to a preset value;

a basic constraint condition 8: a string includes a length limited to a group of preset values; a basic constraint condition 9: a coding block is a square and a string has a length equal to a side of the square;

a basic constraint condition 10: a coding block is a rectangle and a string includes a length equal to a length or a width of the rectangle;

a basic constraint condition 11: a string includes a displacement vector equal to a preset value;

a basic constraint condition 12: a string includes a displacement vector limited to a group of preset values;

a basic constraint condition 13: a coding block is a square, a displacement vector of a string is equal to (0, 1) in horizontal scanning and (1, 0) in vertical scanning, and the displacement vector is equal to a side of the square after being converted to an equivalent one-dimensional offset;

a basic constraint condition 14: a coding block is a rectangle, a displacement vector of a string is equal to (0, 1) in horizontal scanning and (1, 0) in vertical scanning, and the displacement vector is equal to a length or a width of the rectangle after being converted to an equivalent one-dimensional offset; a basic constraint condition 15: a string includes a length limited to a preset value or a group of preset values, and a displacement vector of a string is limited to a preset value or a group of preset values;

a basic constraint condition 16: a reference string includes a length equal to 1 and includes only one reference sample, and a current string includes a length greater than or equal to 1, and all current samples are equal to the reference sample;

a basic constraint condition 17: at least one reference sample is located within a current block;

a basic constraint condition 18: a coding block is two-dimensional and of all strings each is vertical and includes a starting point and an ending point at edges of the coding block; or a basic constraint condition 19: a coding block is two-dimensional and of all strings each is horizontal and includes a starting point and an ending point at edges of the coding block.

4. The method of claim 3, wherein
the plurality of preset constrained string modes comprises three constrained string modes, wherein among the three constrained string modes,
   a first constrained string mode comprises the basic constraint condition 1 and the basic constraint condition 3,
   a second constrained string mode comprises the basic constraint condition 5 and the basic constraint condition 6, and
   a third constrained string mode comprises the basic constraint condition 13, the basic constraint condition 16 and the basic constraint condition 17;
or,
the plurality of preset constrained string modes comprises four constrained string modes, wherein among the four constrained string modes,
   a first constrained string mode comprises the basic constraint condition 1 and the basic constraint condition 3,
   a second constrained string mode comprises the basic constraint condition 5 and the basic constraint condition 6,
   a third constrained string mode comprises the basic constraint condition 13, the basic constraint condition 16 and the basic constraint condition 17, and
   a fourth constrained string mode comprises the basic constraint condition 18 and the basic constraint condition 19.

5. The method of claim 3, wherein
in the basic constraint condition 1, the preset range from the reference position is a region range comprising a CTU where the coding block exists and K neighboring CTUs, and the length of the string includes an upper limit of 32 and/or a lower limit of 1; and
in the basic constraint condition 3, the preset reference set or the preset reference subset is a main reference set, and the upper limit of a total number of the strings is preset to be a total number of samples of the coding block multiplied by a fraction M/N.

6. The method of claim 1, wherein the bitstream comprises an enable flag indicating a string-matching mode of the plurality of constrained string modes, wherein a position of the enable flag in the bitstream comprises at least one of:
a sequence parameter set, picture parameter set, a slice header, a CTU header, a CU header or a coding block header.

7. The method of claim 1, wherein
a directly-presented constrained string mode identification element comprises one or more bits in the bitstream; a indirectly-presented constrained string mode identification element is derived from another coding parameter and/or another syntax element in the bitstream; a directly-indirectly-presented constrained string mode identification element is obtained by mixing a directly-presented part of the constrained string mode identification element and an indirectly-presented part of the constrained string mode identification element.

8. The method of claim 1, wherein
a syntax element of the constrained string mode identification element indicating a constrained string mode of the coding block exists in the bitstream of the coding block in one form of a group consisting of:
   coding block header information, the constrained string mode identification element, a syntax element of a sample string or an unmatched sample; or
   the coding block header information, a part of the constrained string mode identification element, a part of a syntax element of a first sample string, a remaining part of the constrained string mode identification element, the syntax element of the sample string or the unmatched sample, wherein a constrained string mode corresponding to the constrained string mode identification element is used for performing the string-matching encoding on the coding block.

9. An encoding device for data compression, the encoding device comprises a computing device and a storage device for storing program modules executable by the computing device, wherein the program modules comprise:
   a selection module, which is configured to adaptively select a constrained string mode from a plurality of preset constrained string modes; and
   an encoding module, which is configured to perform, according to the selected constrained string mode, string-matching encoding on a coding block to obtain information of a constrained string encoded in the selected constrained string mode and to obtain a bitstream of a syntax element of the constrained string encoded in the selected constrained string mode;
wherein the plurality of preset constrained string modes are represented by a plurality of preset values, wherein each constrained string mode corresponds to a respective preset value k, and the coding block includes a constrained string mode identification element presented in the bitstream directly, indirectly, or directly and indirectly; and
when the constrained string mode identification element is equal to k, a constrained string mode corresponding to k is used for performing the string-matching encoding on the coding block.

10. A decoding method for data compression, comprising:
parsing a bitstream to obtain information of a constrained string mode; and
selecting, according to the information of the constrained string mode, a constrained string mode from a plurality of preset constrained string modes, and performing, according to the selected constrained string mode, string copying decoding on a decoding block;
wherein the plurality of preset constrained string modes are represented by a plurality of preset values, wherein each constrained string mode corresponds to a respective preset value k, and the decoding block includes a constrained string mode identification element presented in the bitstream directly, indirectly, or directly and indirectly; and
when the constrained string mode identification element is equal to k, a constrained string mode corresponding to k is used for performing string copying decoding on the decoding block;
wherein the method is performed by a hardware processor.

11. The method of claim 10, wherein the constrained string mode comprises:
one preset constraint condition; or
a plurality of preset constraint conditions; or
no preset constraint condition.

12. The method of claim 10, wherein a preset constraint condition of the constrained string mode comprises one basic constraint condition or a combination of a plurality of basic constraint conditions of a group consisting of:
a basic constraint condition 1: a string of at least one reference sample taken within a preset range from a reference position includes a length with an upper limit and/or a lower limit;
a basic constraint condition 2: a string of at least one reference sample taken within a preset range from a reference position includes a length limited to a group of preset values;
a basic constraint condition 3: in one decoding block, a number of strings of at least one reference sample taken from a preset reference set or a preset reference subset includes an upper limit;
a basic constraint condition 4: in one decoding block, a number of strings of at least one reference sample taken within a preset range from a reference position includes an upper limit;
a basic constraint condition 5: a string includes a length equal to a number of samples of a decoding block;
a basic constraint condition 6: a string includes a length equal to half a number of samples of a decoding block;
a basic constraint condition 7: a string includes a length equal to a preset value;
a basic constraint condition 8: a string includes a length limited to a group of preset values;
a basic constraint condition 9: a decoding block is a square and a string includes a length equal to a side of the square;
a basic constraint condition 10: a decoding block is a rectangle and a string includes a length equal to a length or a width of the rectangle;
a basic constraint condition 11: a string includes a displacement vector equal to a preset value;
a basic constraint condition 12: a string includes a displacement vector limited to a group of preset values;
a basic constraint condition 13: a decoding block is a square, a displacement vector of a string is equal to (0, 1) in horizontal scanning and (1, 0) in vertical scanning, and the displacement vector is equal to a side of the square after being converted to an equivalent one-dimensional offset;
a basic constraint condition 14: a decoding block is a rectangle, a displacement vector of a string is equal to (0, 1) in horizontal scanning and (1, 0) in vertical scanning, and the displacement vector is equal to a length or a width of the rectangle after being converted to an equivalent one-dimensional offset;
a basic constraint condition 15: a string includes a length limited to a preset value or a group of preset values, and a string includes a displacement vector limited to a preset value or a group of preset values;
a basic constraint condition 16: a reference string includes a length equal to 1 and includes only one reference sample, and a current string includes a length greater than or equal to 1, and all current samples are equal to the reference sample;
a basic constraint condition 17: at least one reference sample is located within a current block;
a basic constraint condition 18: a decoding block is two-dimensional and of all strings each is vertical and includes a starting point and an ending point at edges of the decoding block; and
a basic constraint condition 19: a decoding block is two-dimensional and of all strings each is horizontal and includes a starting point and an ending point at edges of the decoding block.

13. The method of claim 12, wherein
the plurality of preset constrained string modes comprises three constrained string modes, wherein among the three constrained string modes,
a first constrained string mode comprises the basic constraint condition 1 and the basic constraint condition 3,
a second constrained string mode comprises the basic constraint condition 5 and the basic constraint condition 6, and
a third constrained string mode comprises the basic constraint condition 13, the basic constraint condition 16 and the basic constraint condition 17;
or,
the plurality of preset constrained string modes comprises four constrained string modes, wherein among the four constrained string modes,
a first constrained string mode comprises the basic constraint condition 1 and the basic constraint condition 3,
a second constrained string mode comprises the basic constraint condition 5 and the basic constraint condition 6,
a third constrained string mode comprises the basic constraint condition 13, the basic constraint condition 16 and the basic constraint condition 17, and
a fourth constrained string mode comprises the basic constraint condition 18 and the basic constraint condition 19.

14. The method of claim 12, wherein
in the basic constraint condition 1, the preset range from the reference position is a region range comprising a CTU where the decoding block exists and K neighboring CTUs, and the length of the string includes an upper limit of 32 and/or a lower limit of 1; and
in the basic constraint condition 3, the preset reference set or the preset reference subset is a main reference set, and the upper limit of a total number of the strings is preset to be a total number of samples of the decoding block multiplied by a fraction M/N.

15. The method of claim 10, wherein the bitstream comprises an enable flag indicating a string-matching mode of the plurality of constrained string modes, wherein a position of the enable flag in the bitstream comprises at least one of:
a sequence parameter set, picture parameter set, a slice header, a CTU header, a CU header or a decoding block header.

16. The method of claim 10, wherein
a directly-presented constrained string mode identification element comprises one or more bits in the bitstream; an indirectly-presented constrained string mode identification element is derived from another decoding parameter and/or another syntax element in the bitstream; a directly-indirectly-presented constrained string mode identification element is obtained by mixing a directly-presented part of the constrained string mode identification element and an indirectly-presented part of the constrained string mode identification element.

17. The method of claim 10, wherein
a syntax element of the constrained string mode identification element indicating a constrained string mode of the decoding block exists in the bitstream of the decoding block in one form of a group consisting of:
   decoding block header information, the constrained string mode identification element, a syntax element of a sample string or an unmatched sample; or
   the decoding block header information, a part of the constrained string mode identification element, a part of a syntax element of a first sample string, a remaining part of the constrained string mode identification element, the syntax element of the sample string or the unmatched sample, wherein a constrained string mode corresponding to the constrained string mode identification element is used for performing the string copying decoding on the decoding block.

18. A decoding device for data compression, the decoding device comprises a computing device and a storage device for storing program modules executable by the computing device, wherein the program modules comprising:
   a parsing module, which is configured to parse a bitstream to obtain information of a constrained string mode; and
   a decoding module, configured to select, according to the information of the constrained string mode, a constrained string mode from a plurality of preset constrained string modes and to perform, according to the selected constrained string mode, string copying decoding on a decoding block;
   wherein the plurality of preset constrained string modes are represented by a plurality of preset values, wherein each constrained string mode corresponds to a respective preset value k, and the decoding block includes a constrained string mode identification element presented in the bitstream directly, indirectly, or directly and indirectly; and
   when the constrained string mode identification element is equal to k, a constrained string mode corresponding to k is used for performing string copying decoding on the decoding block.

* * * * *